2,844,589
PROCESS FOR THE PREPARATION OF Δ²-OXAZOLINE

Lawrence G. Hess, Charleston, W. Va., assignor to Union Carbide Corporation, a corporation of New York No Drawing. Application June 5, 1953
Serial No. 359,970

5 Claims. (Cl. 260—307)

This invention relates to a process for the preparation of Δ²-oxazoline, and more particularly to a process for the preparation of Δ²-oxazoline by the dehydration of N-(2-hydroxyethyl)formamide.

A convenient and economical method for the preparation of Δ²-oxazoline has long been lacking in the art, and, inasmuch as Δ²-oxazoline and its derivatives possess potentialities as solvents, chemical intermediates, textile finishing agents, vulcanization accelerators, and local anesthetics, a suitable method for its preparation is of particular interest.

Accordingly it is an object of this invention to provide a relatively inexpensive process for the preparation of Δ²-oxazoline.

Furthermore, it is an object of this invention to provide a process for the preparation of Δ²-oxazoline which does not involve the use of the expensive and corrosive reagents such as those employed by the prior art investigators.

Heretofore, the methods for the preparation of Δ²-oxazoline have not been feasible for large scale industrial operations. The prior art investigators prepared Δ²-oxazoline by dehydrochlorinating beta-chloroethyl formamide with aqueous alkali but the process was accompanied by decomposition of the desired product, thus giving poor yields of the Δ²-oxazoline.

This invention, however, is directed to a process for the preparation of Δ²-oxazoline which comprises heating N-(2-hydroxyethyl)formamide at an elevated temperature. This invention is also directed to a process for the preparation of Δ²-oxazoline, which comprises heating N-(2-hydroxyethyl) formamide in the presence of a dehydrating agent. More particularly, this invention contemplates the use of dehydrating agents, such as, for example, Super Filtrol (diatomaceous earth), sulfuric acid, aluminum oxide and iron oxide.

The reaction, either in liquid phase or vapor phase, whereby Δ²-oxazoline is obtained in accordance with this invention may be written as follows:

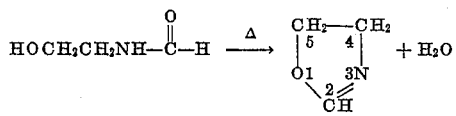

The temperature of the dehydration step is carried out at a temperature in the range 150° C. to about 250° C. as shown in the following examples.

Inasmuch as Δ²-oxazoline reverts readily to N-(2-hydroxyethyl)formamide when in the presence of water, it is necessary to separate the product from water as soon as possible. This may be accomplished by any desirable means which are readily apparent to those skilled in the art. A preferred method for the recovery of the Δ²-oxazoline is by extraction with a suitable extractant such as, for example, chloroform or carbon tetrachloride.

If prolonged storage of the extract is contemplated, the extract should be dried by inclusion of suitable drying agents. Drying the extract was also found to be beneficial prior to distillation and isolation of the Δ²-oxazoline.

The dehydration of N-(2-hydroxyethyl)formamide to Δ²-oxazoline is sometimes accompanied by decomposition to monoethanolamine and carbon monoxide. If desired, the monoethanolamine may be re-used to prepare N-(2-hydroxyethyl)formamide. Any N-(2-hydroxyethyl) formamide which may be inadvertently distilled during the dehydration step, or formed by reversion of the Δ²-oxazoline may be recycled through the dehydration step.

The following examples will serve to illustrate the practice of the invention:

Example I

Equimolecular quantities of monoethanolamine and formic acid were added to a five-liter glass kettle equipped with a stirrer, thermometer and reflux condenser. The kettle was immersed in a cooling bath and the temperature of the reaction was maintained at 50–55° C. The crude N-(2-hydroxyethyl)formamide formed was then distilled through a glass still column packed with stainless steel sponge at a kettle temperature of 160–200° C. under an absolute pressure of 5–20 mm. of mercury and the low-boiling product was collected in cold traps immersed in carbon dioxide-acetone solution. One portion of this cold trap material was stored for a period of two days and was found to contain 75% N-(2-hydroxyethyl) formamide. Another portion of this material was extracted with carbon tetrachloride and the extract gave upon distillation a fraction boiling at 94.6–95° C. and having a molecular weight of 71. This fraction contained 50.8%, C.; 7.6%, H; 19.1%, N; which corresponds to the theoretical elemental analysis of Δ²-oxazoline, and gave the mass spectrometer pattern predicted for Δ²-oxazoline. From its reversion to N-(2-hydroxyethyl) formamide and the foregoing analytical data, the material was determined to be Δ²-oxazoline.

Example II

When 252 grams of N-(2-hydroxyethyl)formamide were passed over aluminum oxide at 248–253° C. (under 10 mm. of mercury, absolute pressure) in an essentially vapor phase process, approximately 23 grams of Δ²-oxazoline were produced. The product when analyzed mass spectrometrically gave the same pattern as the material produced in Example I. Approximately 32 percent of the N-(2-hydroxyethyl)formamide was converted, 36 grams of monoethanolamine being produced in addition to the Δ²-oxazoline.

Example III

When 230 grams of N-(2-hydroxyethyl)formamide were heated with 35 grams of Super Filtrol (diatomaceous earth) at 198° C. (45 mm. of mercury) for a period of about two hours, the aqueous solution collected in cold traps was found to contain 22 grams of Δ²-oxazoline agreeing mass spectrometrically with that produced in Example I. The N-(2-hydroxyethyl)formamide conversion was 22 percent, the yield of monoethanolamine being 10 percent based on the amount of N-(2-hydroxyethyl)formamide charged.

Example IV

Heating 295 grams of N-(2-hydroxyethyl)formamide with 0.05 gram of sulfuric acid at 155–160° C. (6 mm. of mercury) gave 6 grams of Δ²-oxazoline over a period of 3.5 hours. The dehydration was accompanied by decomposition to monoethanolamine, the yield being 48 percent.

Example V

Two hundred and thirty-three grams of N-(2-hydroxyethyl)formamide were heated at 180° C. at 20 mm. of mercury pressure in the presence of 12 grams of iron oxide in a laboratory still kettle. Twenty grams of $\Delta^2$-oxazoline, were collected as an aqueous solution in cold traps after a period of 3.5 hours. The product obtained by extraction with carbon tetrachloride gave the same mass spectrometric pattern as the material isolated in Example I. About 24 percent of the N-(2-hydroxyethyl)formamide was converted. Approximately 21 grams of monoethanolamine was formed.

I claim:

1. A process for the preparation of $\Delta^2$-oxazoline which comprises heating N-(2-hydroxyethyl)formamide at an elevated temperature in the range 150° C. to 250° C. under reduced pressures in the presence of a dehydrating agent selected from the group consisting of aluminum oxide, iron oxide, sulfuric acid and diatomaceous earth and recovering the $\Delta^2$-oxazoline thus produced.

2. A process for the preparation of $\Delta^2$-oxazoline which comprises heating N-(2-hydroxyethyl)formamide at an elevated temperature in the range 150° C. to 250° C. under reduced pressures in the presence of aluminum oxide and recovering the $\Delta^2$-oxazoline thus produced.

3. A process for the preparation of $\Delta^2$-oxazoline which comprises heating N-(2-hydroxyethyl)formamide at an elevated temperature in the range 150° C. to 250° C. under reduced pressures in the presence of iron oxide and recovering the $\Delta^2$-oxazoline thus produced.

4. A process for the preparation of $\Delta^2$-oxazoline which comprises heating N-(2-hydroxyethyl)formamide at an elevated temperature in the range 150° C. to 250° C. under reduced pressures in the presence of sulfuric acid and recovering the $\Delta^2$-oxazoline thus produced.

5. A process for the preparation of $\Delta^2$-oxazoline which comprises heating N-(2-hydroxyethyl)formamide at an elevated temperature in the range 150° C. to 250° C. under reduced pressures in the presence of diatomaceous earth and recovering the $\Delta^2$-oxazoline thus produced.

References Cited in the file of this patent

Wenker: J. Am. Chem. Soc., vol. 57, pp. 1079–80 (1935).

Wiley et al.: Chem. Reviews, vol. 44, pp. 452–4 (1949).